(12) United States Patent
Takeuchi

(10) Patent No.: US 6,240,242 B1
(45) Date of Patent: *May 29, 2001

(54) RECORDING APPARATUS FOR RECORDING MOVING IMAGE AND STILL IMAGE

(75) Inventor: Yoshitaka Takeuchi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,264

(22) Filed: Mar. 21, 1997

(30) Foreign Application Priority Data

Mar. 29, 1996 (JP) .................................................. 8-076529

(51) Int. Cl.[7] .............................. H04N 5/782; H04N 5/77
(52) U.S. Cl. .......................................... 386/121; 386/120
(58) Field of Search ....................................... 386/121, 120, 386/124, 107, 109, 46, 38, 40, 117; 360/32; H04N 5/782, 5/77

(56) References Cited

U.S. PATENT DOCUMENTS

| | | | |
|---|---|---|---|
| 4,544,960 | * 10/1985 | Konishi | 386/120 |
| 5,027,214 | * 6/1991 | Fujimori | 386/107 |
| 5,202,798 | * 4/1993 | Takei et al. | 386/120 |
| 5,585,934 | * 12/1996 | Yoshimura et al. | 386/120 |

* cited by examiner

*Primary Examiner*—Robert Chevalier
(74) *Attorney, Agent, or Firm*—Fitzpatrick, Cella, Harper & Scinto (57) ABSTRACT

In recording image data in a recording medium, a recording apparatus detects whether a still image is recorded at the recording start position of the image data of the recording medium. In accordance with the detection result, the recording apparatus controls a recording operation so as to record the image data in an area subsequent to an area of the recording medium in which the still image is recorded.

18 Claims, 7 Drawing Sheets

FIG. 6

RECORDING APPARATUS FOR RECORDING MOVING IMAGE AND STILL IMAGE

BACKGROUND OF THE INVENTION

1. Field of the Invention

The present invention relates to a recording apparatus and, more particularly, to an apparatus capable of recording moving and still images.

2. Related Background Art

A digital VTR has conventionally been known as an apparatus for recording video data and audio data as digital data on a magnetic tape and reproducing them. In such a digital VTR, image data of one frame in reproduced moving image data is stored in a memory, and output as a still image by repeatedly reading out the image data of one frame. At this time, the image data of one frame may not be properly reproduced due to an error of the reproduced data or a dropout.

To obtain a fine still image also in this VTR, there is considered a method of repeatedly reading out image data of the same frame stored in a memory in recording, and recording the data on a tape for several seconds, thereby recording the image data as a still image.

When a large number of still images are recorded as moving images on a tape in this manner, the large number of still images must be retrieved.

For this purpose, when a still image is recorded in the digital VTR, a flag indicating that the still image is recorded is recorded together with image data. In reproduction, the still image is retrieved using this flag.

If, however, halfway recording is performed with respect to a tape recording moving and still images in this manner, a still image recorded at the start portion of halfway recording, or a flag for retrieving the still image may be undesirably erased.

SUMMARY OF THE INVENTION

It is an object of the present invention to solve the above-described problem.

It is another object of the present invention to enable proper retrieval of a still image even if halfway recording is performed when moving and still images can be recorded.

To achieve these objects, according to one aspect of the present invention, there is provided a recording apparatus comprising recording means for recording image data on a recording medium, detection means for detecting whether a still image is recorded at a recording start position of the image data of the recording medium, and control means for controlling the recording means in accordance with a detection result of the detection means so as to record the image data in an area subsequent to an area of the recording medium in which the still image is recorded.

The above and other objects, and features, and advantages of the present invention will be apparent from the following description of the preferred embodiments in conjunction with the accompanying drawings.

DESCRIPTION OF THE PREFERRED EMBODIMENTS

Embodiments of a means devised in the present invention will be described in detail below with reference to the accompanying drawings.

Figure 1:
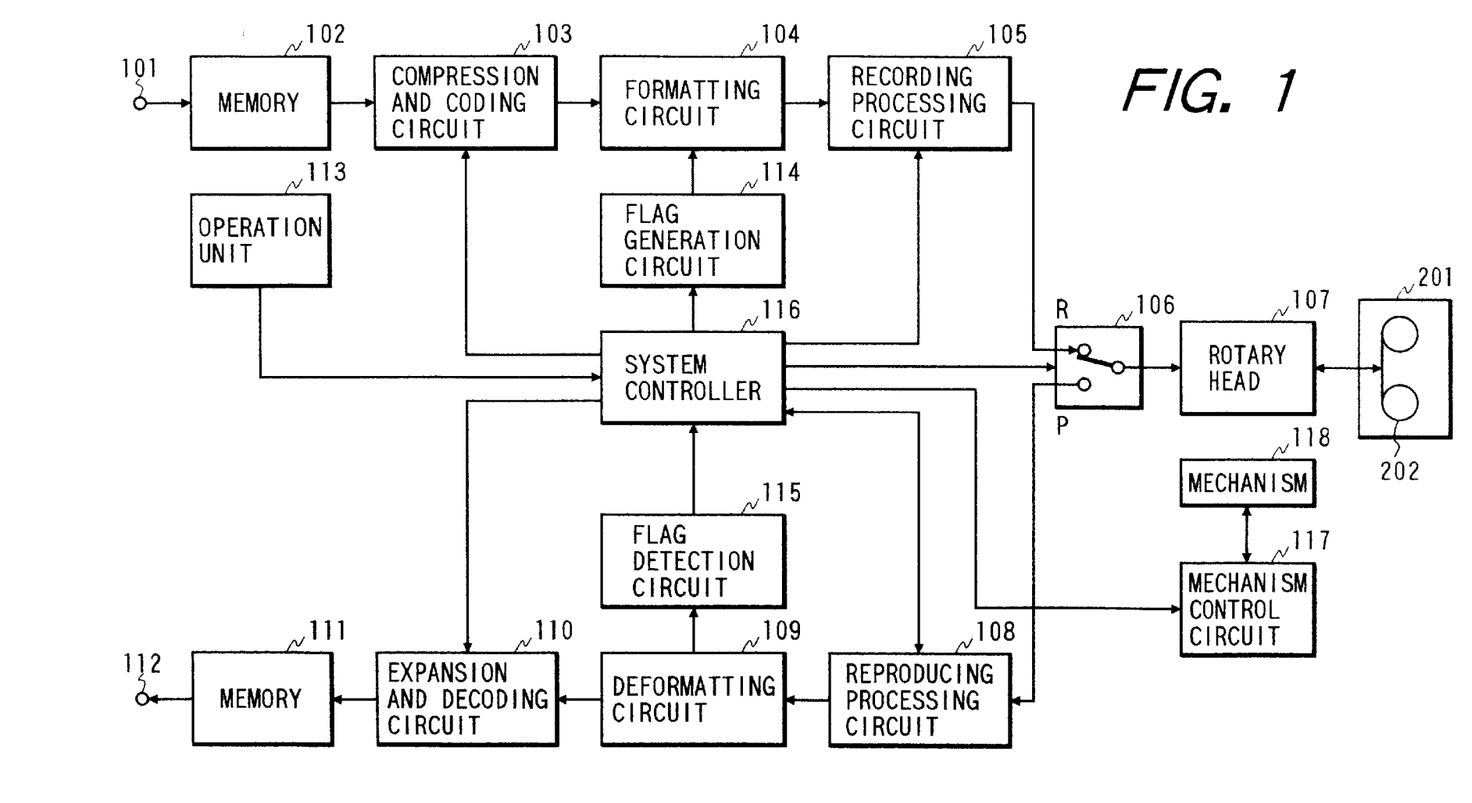
FIG. 1 is a block diagram showing the arrangement of a digital VTR according to an embodiment of the present invention.

FIG. 1 is a block diagram showing the arrangement of a digital VTR according to an embodiment of the present invention.

First, a basic recording operation will be described.

The apparatus in FIG. 1 can record moving and still images, as described above. A recording operation for a moving image will be explained first.

In this case, a moving image recording mode is set with the mode switch of an operation unit 113. A system controller 116 controls the operations of respective portions of the VTR in accordance with the set mode and the operations of other switches of the operation unit 113. When the moving image recording mode is set, and a recording switch for designating recording of an image is operated, the system controller 116 drives a mechanism 118 such as a capstan, reels, and a drum mounted with a rotary head 107 through a mechanism control circuit 117.

Digital image data input through an input terminal 101 is written in a memory 102. Moving image data read out from the memory 102 is compressed in an information amount and coded by a compression and coding circuit 103 using well-known techniques such as quantization and variable-length coding, and then output to a formatting circuit 104. The formatting circuit 104 rearranges the image data, and audio data and sub-code data (neither are shown) in accordance with the recording format, and outputs them to a recording processing circuit 105. The recording processing circuit 105 performs error correction coding using a well-known product code or the like, and digital modulation processing with respect to the recorded data rearranged by the formatting circuit 104, and outputs the obtained data to the rotary head 107 through a switch 106.

The rotary head 107 forms a large number of helical tracks by tracing a magnetic tape 202 in a cassette 201 conveyed by the mechanism 118, and records the image data as a moving image. At the same time, the rotary head 107 records other recording data.

In reproduction, the rotary head 107 reproduces the recorded data by tracing the tape 202 conveyed by the mechanism 118, and outputs the data to a reproducing processing circuit 108 through the switch 106. The reproducing processing circuit 108 demodulates the reproduced data, corrects an error in the reproduced data by using parity data added in recording, and outputs the obtained data to a deformatting circuit 109. The deformatting circuit 109 separates the reproduced data into image data, audio data, and other data, and outputs the image data to an expansion and decoding circuit 110. The expansion and decoding circuit 110 decodes the reproduced data by performing processing reverse to that in recording. At the same time, the expansion and decoding circuit 110 expands the information amount of the data, and writes the resultant data in a memory 111. The data read out from the memory 111 is output through a terminal 112.

Next, a recording operation for a still image will be described. In this case, a still image recording mode is set with the mode switch of the operation unit 113.

When a storage switch for designating storage of an image is operated in the still image recording mode, the system controller 116 writes image data of one frame in the memory 102, and inhibits subsequent writing of image data in the memory 102. The system controller 116 displays the currently stored image on a monitor (not shown). When the user confirms this image on the monitor and determines that this image should be recorded, the user operates the recording switch for designating recording of the image. Then, the system controller 116 repeatedly reads out this image of one frame stored in the memory 102. The compression and coding circuit 103 performs the above-described processing with respect to the readout data, and outputs it to the formatting circuit 104.

When the user determines that the still image stored in the memory is unsuitable for recording, the user erases the image data from the memory with an erase switch. A new image is then stored.

The system controller 116 causes a flag generation circuit 114 to generate a still image flag indicating that a still image is recorded, and outputs the still image flag to the formatting circuit 104. In the still image mode, the formatting circuit 104 rearranges image data, audio data, and sub-code data together with this still image flag, and outputs them to the rotary head 107 through the recording processing circuit 105 and the switch 106.

In the still image mode, the system controller 116 controls the mechanism control circuit 117 to convey the tape 202 for several seconds, e.g., 5 sec, and records the still image data, the audio data, and the sub-code data on the tape 202 with the head 107, similar to recording of a moving image. The still image flag is also recorded in a predetermined area of each track for 5 sec. After the still image is recorded for 5 sec, the system controller 116 stops conveying the tape to wait for designation to record a next still image.

In reproduction, similar to reproduction of a moving image, the data reproduced by the head 107 is processed by the reproducing processing circuit 108, and output to the deformatting circuit 109. When the still image flag is output from the deformatting circuit 109, the flag detection circuit 115 informs the system controller 116 of this. Upon detection of the still image flag, the system controller 116 stops conveying the tape 202. As a stop method, e.g., the leading edge of the still image flag is detected to stop the conveyance, or the trailing edge of the still image flag is detected to stop the conveyance.

The image data separated by the deformatting circuit 109 is decoded and expanded by the expansion and decoding circuit 110, similar to reproduction of a moving image. The resultant data is output through the memory 111.

Next, a halfway recording operation in this embodiment will be described. Prior to a description of an actual operation, the recording form of a still image flag will be explained.

When a still image is recorded for several seconds in the above-described manner, various patterns are considered as the recording timings of a flag during recording of the still image. FIGS. 2A to 2D are views each showing the state of a still image and a still image flag recorded on a tape in this manner.

Figures 2A, 2B, 2C:
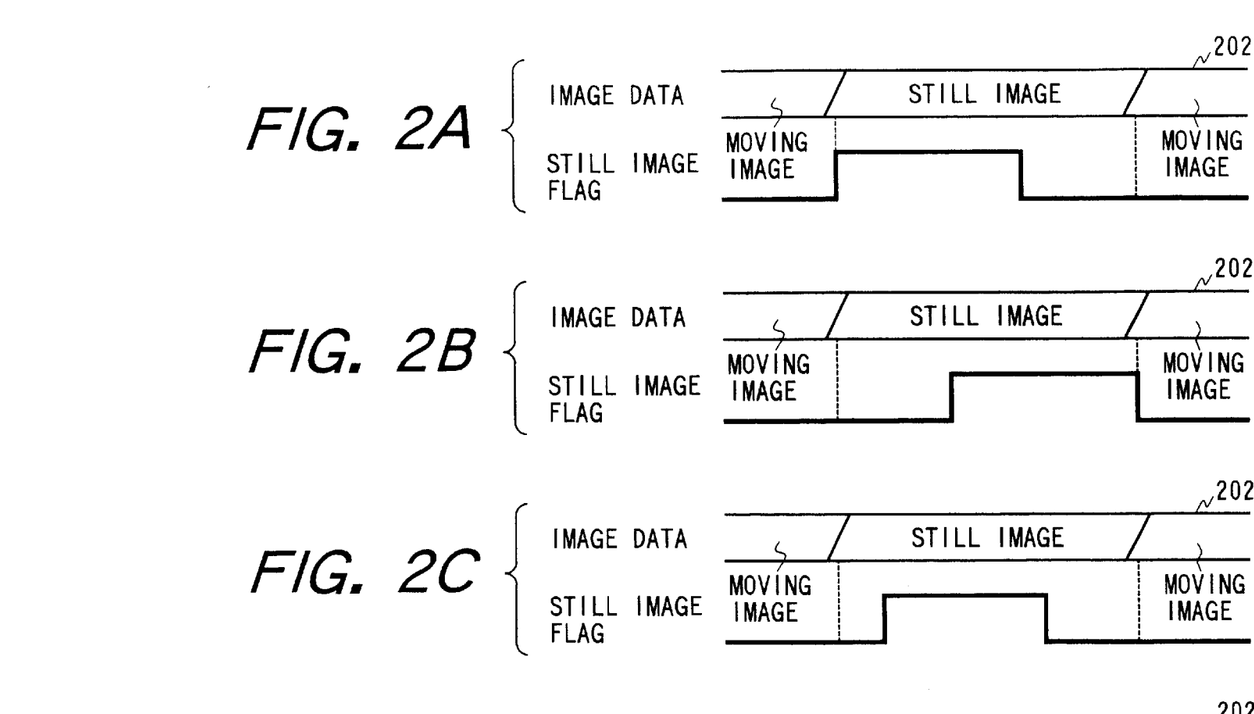
FIGS. 2A, 2B, 2C and 2D are views each showing the state of recorded data on a tape.
Figure 2D:
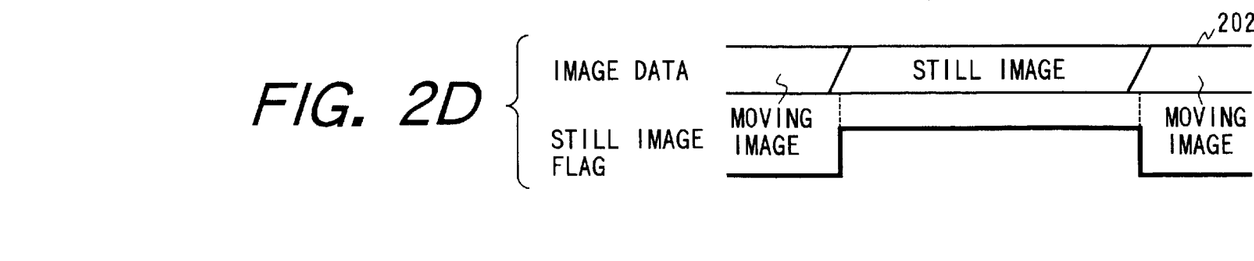

FIG. 2A shows a case wherein the still image flag is recorded when recording the still image is started. FIG. 2B shows a case wherein the still image flag is recorded in accordance with the recording end position of the still image. FIG. 2C shows a case wherein the still image flag is recorded recording of the still image. FIG. 2D shows a case wherein the still image flag is kept recorded during recording of the still image.

When the still image is recorded by various methods in this manner, the following problems may be posed in halfway recording during recording of the still image.

Figure 3A:
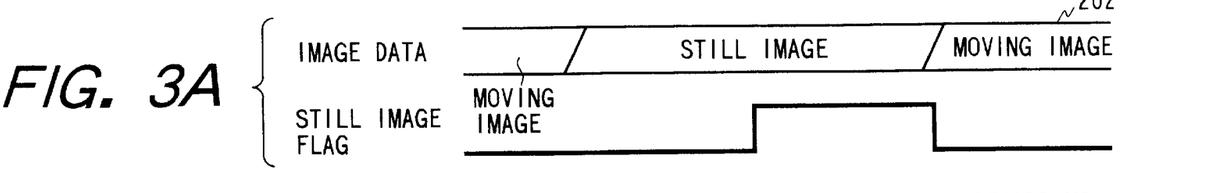
FIGS. 3A, 3B, 3C and 3D are views each showing the state of data recorded on the tape.
Figure 3B:
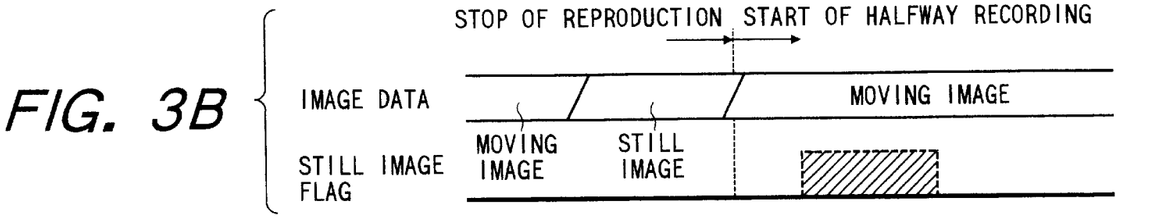
Figure 3C:
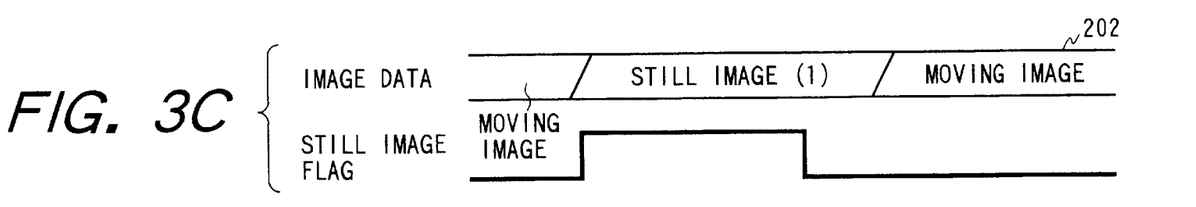

That is, when the still image is recorded as shown in FIG. 2B, the tape is stopped at a given position during recording of the still image, and halfway recording of a moving image is started from the given position, the still image flag is erased as shown in FIG. 3B. Although the still image is recorded immediately before the halfway-recorded portion, this still image cannot be retrieved.

If the still image is recorded as shown in FIG. 2A, the tape is stopped at a given position during recording of the still image, and halfway recording of a still image is started from the given position, two different kinds of still images and still image flags are consecutively recorded, as shown in FIG. 3A.

By this recording, the still image flags are consecutively recorded. For this reason, in retrieving the still images after recording, still image 1 originally recorded and still image 2 recorded afterward cannot be accurately retrieved.

The digital VTR of this embodiment eliminates these disadvantages. A detailed halfway recording operation will be described below.

In this embodiment, a still image flag is recorded as shown in FIG. 2B. In the following halfway recording operation, halfway recording is performed for a data-recorded tape as shown in FIG. 2B.

Figure 4:
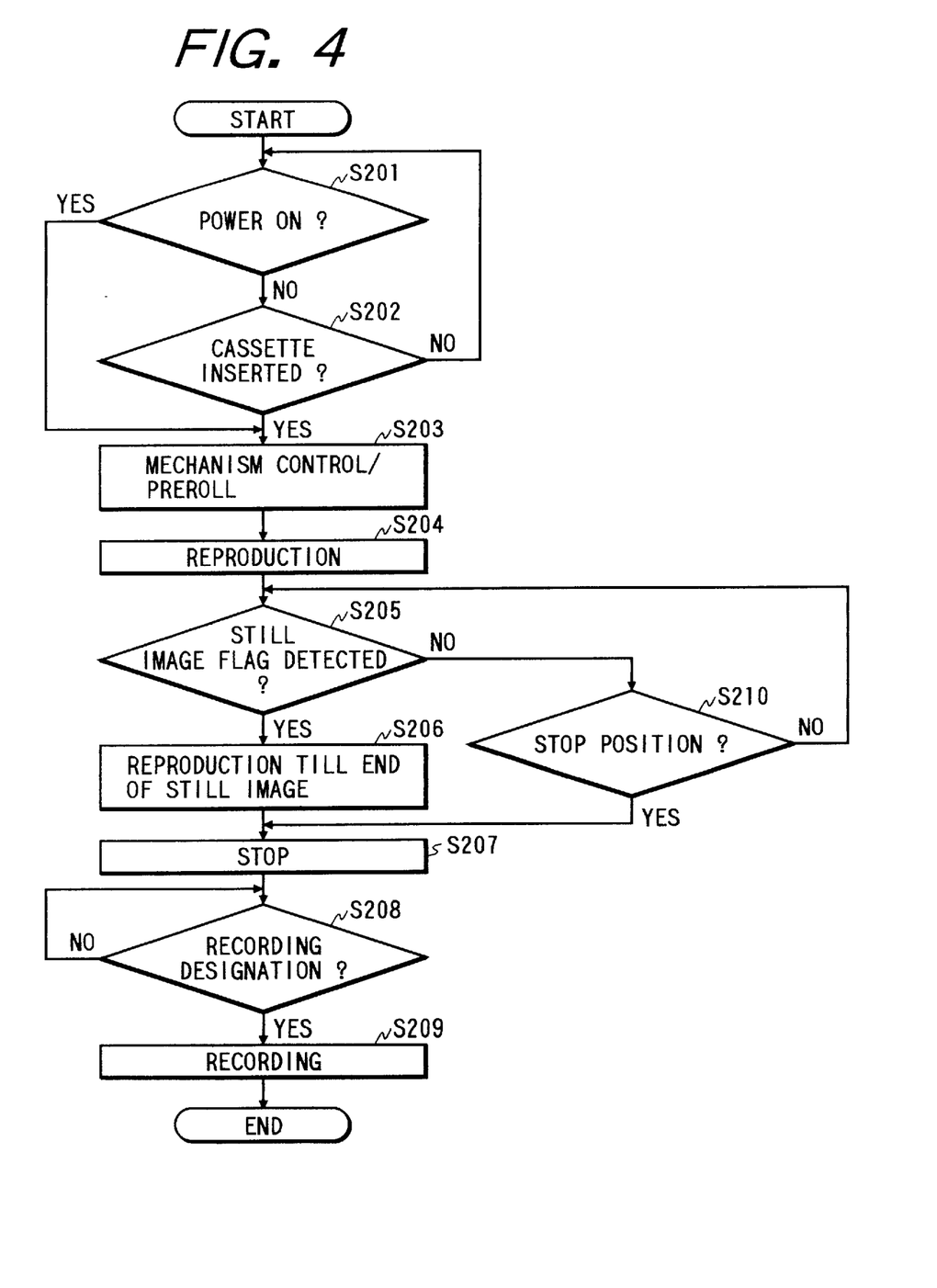
FIG. 4 is a flow chart for explaining the operation of the VTR in FIG. 1.

FIG. 4 is a flow chart for explaining the operation of the system controller 116 in halfway recording. The operation will be explained below with reference to FIG. 4.

First, it is detected whether power is ON by the power supply switch of the operation unit 113 (step S201). If the power supply switch is not operated, or power has already been supplied, it is detected whether the cassette 201 is set (step S202). This detection can be performed by the cassette detection mechanism of the mechanism 118.

If the power supply switch is operated to supply power, or a new cassette is set, the system controller 116 controls the mechanism control circuit 117 to rewind (preroll) the tape 202 by a predetermined amount, e.g., for about 5 sec as the recording period of one still image (step S203). The tape 202 is conveyed again to reproduce data with the head 107 (step S204).

It is detected whether a still image flag is included in the reproduced data (step S205). If YES, it is determined that a still image is recorded at the start position of halfway recording. The tape is conveyed to the recording end position of the still image indicated by the still image flag on the basis of the reproduced still image flag (step S206), and the conveyance is stopped (step S207).

If no still image flag is included in the reproduced data, and the tape is conveyed to a position at which power is supplied, or a position at which the cassette is set (step S210). It is determined that no still image is recorded at that position, and the conveyance is stopped. Note that the position of the tape when power is supplied or the cassette is set can be detected by track number data in sub-code data recorded on each track. By comparing the tape position with the track number data in the reproduced sub-code data, the conveyance of the tape is stopped.

After the tape is rewound, and its conveyance is stopped in this manner, the flow waits for designation from the recording switch (step S208), and recording is performed as described above (step S209).

Figure 5A:
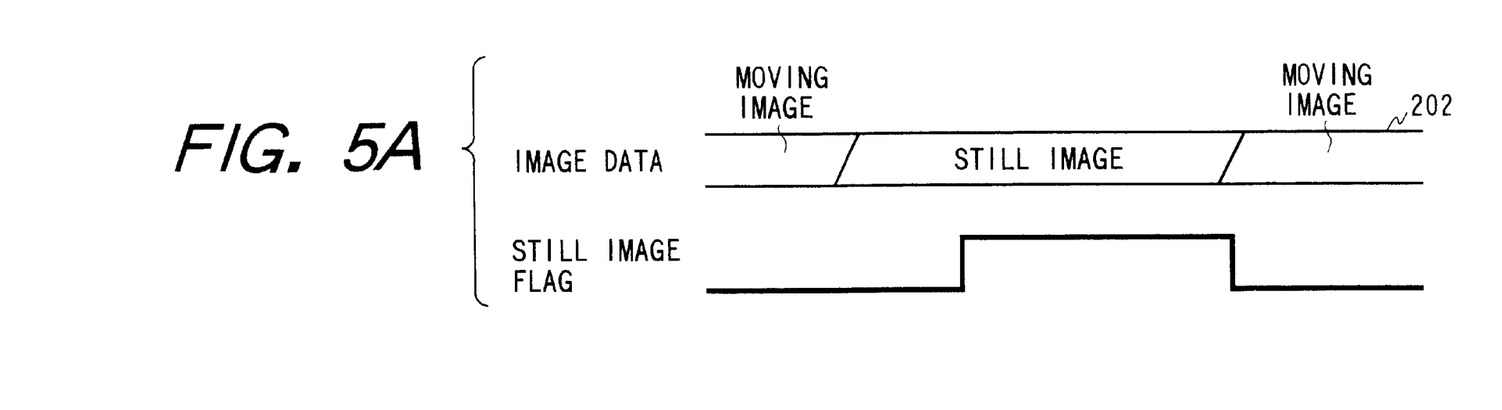
FIGS. 5A and 5B are views each showing the state of data recorded by the VTR in FIG. 1.
Figure 5B:
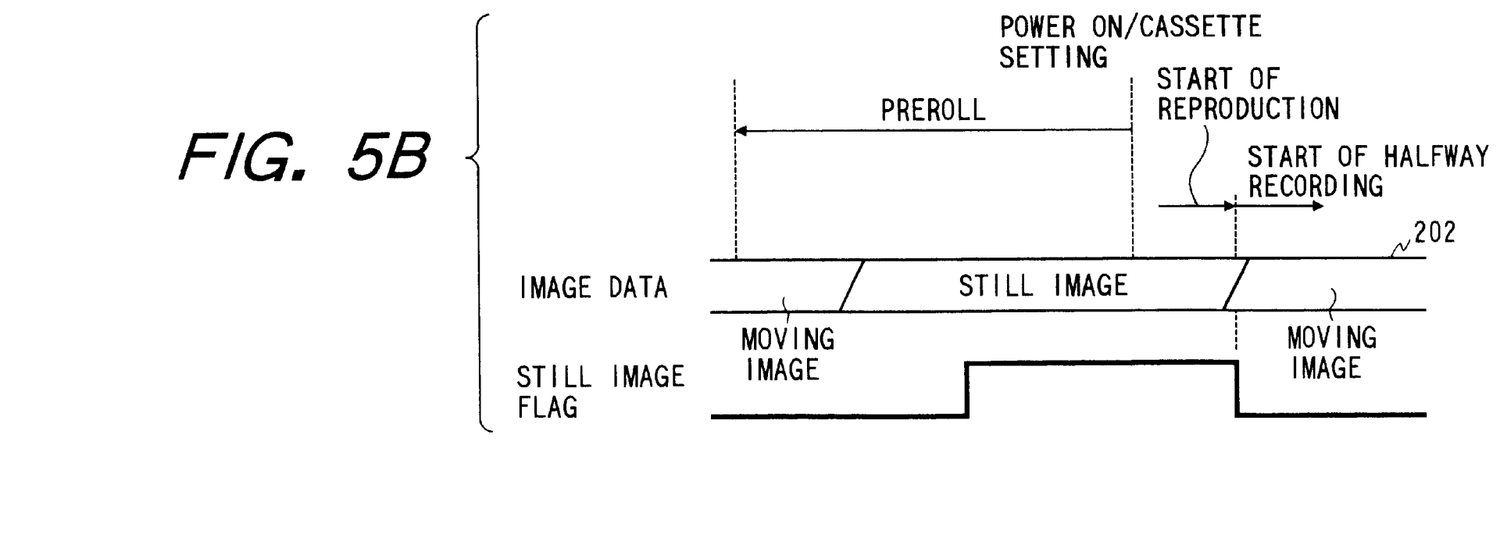

In this embodiment, when halfway recording is performed like an example shown in FIG. 3A, a still image and a still image flag are not erased by halfway recording even if, as shown in FIG. 5A, the still image is recorded at the tape position when power is supplied or the cassette is set, and the still image flag is recorded in accordance with the end of recording of the still image.

The still image recorded at the boundary portion of halfway recording can be reliably detected.

This embodiment exemplifies the case wherein a still image flag is recorded in accordance with the end of recording of the recorded portion of a still image. For example, even when the still image flag is recorded in accordance with the start of recording of the still image, as shown in FIG. 2A, the still image at the boundary portion of halfway recording can be saved by arranging the VTR as shown in FIG. 6.

Figure 6:
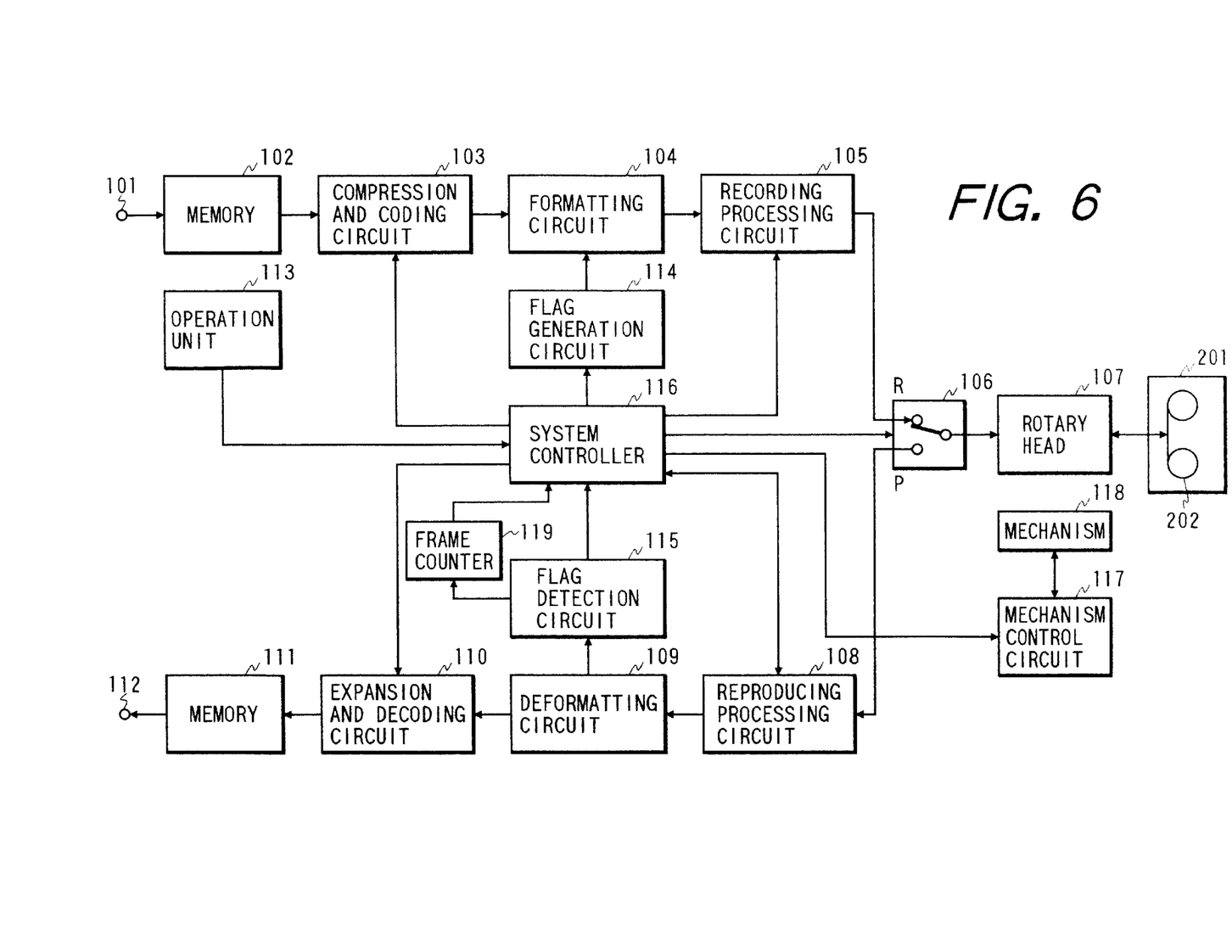
FIG. 6 is a block diagram showing the arrangement of a digital VTR according to another embodiment of the present invention.

More specifically, a frame counter for starting counting in response to an output from a flag detection circuit 115 is arranged in FIG. 6. The frame counter starts counting in response to detection of the leading edge of a still image flag by the flag detection circuit 115. After the tape is conveyed by the recording period of a still image, the conveyance is stopped.

Figure 3D:
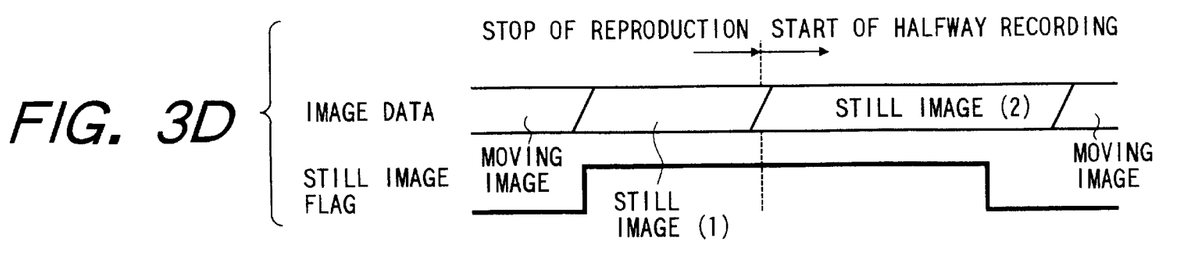

When a still image flag is recorded in accordance with the start of recording of a still image, as shown in FIG. 2A, if another still image is recorded again subsequent to the still image without any processing, still image flags are consecutively recorded as shown in FIG. 3D.

Figure 7A:
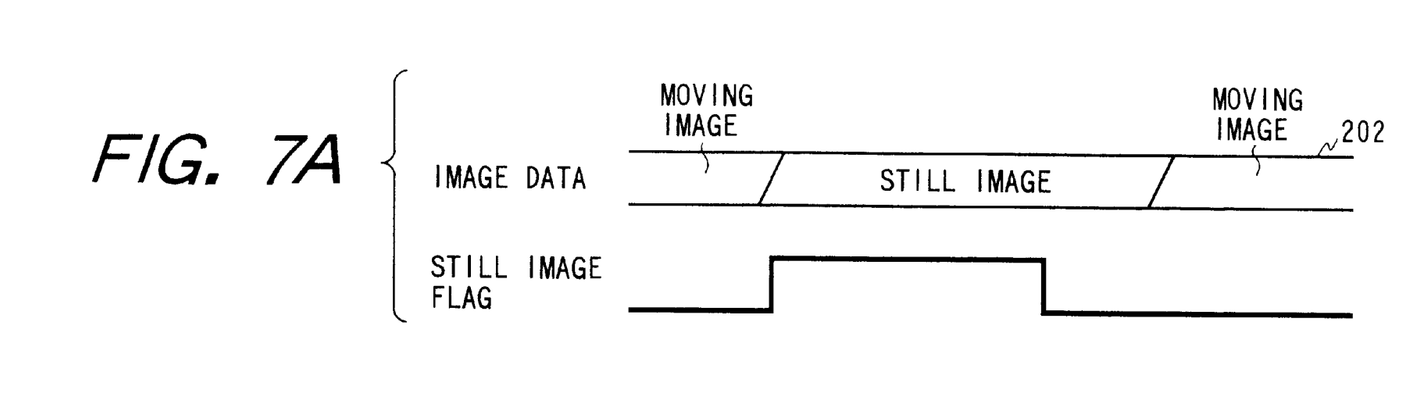
FIGS. 7A and 7B are views each showing the state of data recorded by the VTR in FIG. 6.
Figure 7B:
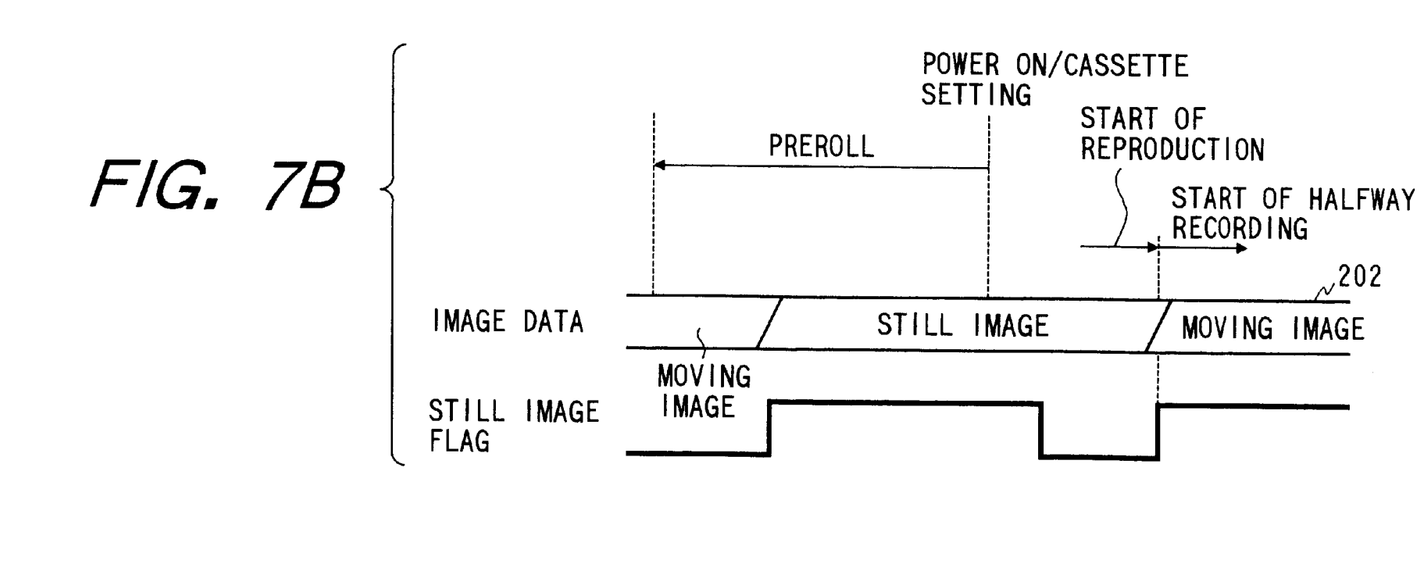

In this embodiment, however, even when halfway recording of still images is performed, still image flags are not consecutively recorded, as shown in FIGS. 7A and 7B. Both the still images can be accurately detected.

In the above-described embodiment, the tape is rewound when power is supplied or the cassette is set. The present invention is not limited to this, and can employ any method as far as it can be detected whether a still image is recorded at the recording start position of halfway recording. For example, a still image flag may be detected from reproduced data by tracing the tape with the head 107 while the tape is kept stopped at the recording start position.

In this case, if the still image flag is detected, the tape is conveyed to the recording end position of the still image; if no still image flag is detected, recording is started from this position.

The above-mentioned embodiment exemplifies the case wherein the present invention is applied to the digital VTR. The present invention is not limited to this, and can be applied to an apparatus for recording an image signal on another recording medium, e.g., a magnetic disk, a magneto-optical disk, or a semiconductor memory. The same effect can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:

recording means for recording image data in a plurality of tracks formed on a tape-shaped recording medium on which moving image data and still image data are recorded, each of the still image data and the moving image data being recorded on a plurality of tracks formed on the tape-shaped recording medium;

detection means for detecting that the still image data has been previously recorded at a track corresponding to a recording start position of the image data to be recorded on the tape-shaped recording medium; and control means for controlling said recording means in accordance with a detection result of said detection means so as to start recording the image data at a track subsequent to an area of the tape-shaped recording medium in which the still image data detected by said detection means is recorded.

2. An apparatus according to claim 1, wherein said recording means comprises conveying means for conveying the tape-shaped recording medium, and wherein said control means controls said conveying means in accordance with the detection result of said detection means so as to conveying the tape-shaped recording medium to a recording end position of the still image data detected by said detection means.

3. An apparatus according to claim 2, wherein said control means controls said conveying means in accordance with the detection result of said detection means so as to convey the tape-shaped recording medium to the recording end position of the still image when the still image data is recorded at the recording start position, and to stop the tape-shaped recording medium at the recording start position when no still image data is recorded at the recording start position.

4. An apparatus according to claim 1, further comprising reproducing means for reproducing data from the tape-shaped recording medium, so that said detection means detects, on the basis of the data reproduced by said reproducing means, that the still image data is recorded at the recording start position.

5. An apparatus according to claim 4, wherein a large number of tracks respectively recording image data are formed on the tape-shaped recording medium, and wherein the reproduced data includes a flag indicating that the image data recorded on each track comprises image data corresponding to a still image.

6. An apparatus according to claim 5, wherein the flags are recorded on a large number of tracks on which the still images are recorded.

7. An apparatus according to claim 1, wherein said control means performs the control operation when power is supplied.

8. An apparatus according to claim 1, wherein said control means performs the control operation when said recording medium is set in said apparatus.

9. An apparatus according to claim 1, wherein the image data is digital image data, and said recording means comprises coding means for compressing an information amount of the digital image data, and coding the digital image data.

10. A recording apparatus comprising:

a switch for supplying power;

recording means for recording image data in a plurality of tracks formed on a tape-shaped recording medium on which moving image data and still image data are recorded, each of the still image data and the moving image data being recorded on a plurality of tracks formed on the tape-shaped recording medium;

conveying means for conveying the tape-shaped recording medium;

detection means for detecting, upon supplying the power by said switch, that the still image has been previously recorded at a track corresponding to a recording start position of the image data to be recorded on the tape-shaped recording medium; and control means for controlling said conveying means in accordance with a detection result of said detection means so as to convey the tape-recording medium and stop conveying the tape-shaped recording medium at a track subsequent to an area of the tape-shaped recording medium in which the still image data detected by said detection means is recorded.

11. An apparatus according to claim 10, wherein said control means controls said conveying means so as to convey said tape-shaped recording medium to at least an end position of a recording area of the still image when the still image data is recorded at the recording start position.

12. An apparatus according to claim 10, wherein said control means controls said conveying means so as to stop said tape-shaped recording medium when no still image is recorded at the recording start position.

13. A recording apparatus comprising:

recording means for recording image data in a plurality of tracks formed on a tape-shaped recording medium on which moving image data and still image data are recorded, each of the still image data and the moving image data being recorded on a plurality of tracks formed on the tape-shaped recording medium;

conveying means for conveying the tape-shaped recording medium;

first detection means for detecting that the recording medium is set;

second detection means for detecting, in accordance with a detection result of said first detection means, that the still image data is recorded at a recording start position of the image data on the tape-shaped recording medium; and control means for controlling said conveying means in accordance with a detection result of said second detection means so as to convey the tape-shaped recording medium and stop conveying the tape-shaped recording medium at a track subsequent to an area of the tape-shaped recording medium in which the still image data detected by said detection means is recorded.

14. An apparatus according to claim 13, wherein said second detection means performs the detection operation when said first detection means detects that said recording medium is set.

15. An apparatus according to claim 13, wherein said control means controls said conveying means so as to convey the tape-shaped recording medium to at least an end position of a recording area of the still image data when the still image data is recorded at the recording start position.

16. An apparatus according to claim 13, wherein said control means controls said conveying means so as to stop the tape-shaped recording medium when no still image data is recorded at the recording start position.

17. A recording apparatus for performing a halfway recording of image data on a tape-shaped recording medium on which (i) a plurality of tracks are formed and (ii) moving image data and still image data are recorded in the plurality of tracks, said apparatus comprising:

recording means for recording the image data on the tape-shaped recording medium;

detection means for detecting that the still image data has been previously recorded at a track corresponding to a halfway recording start position of the image data to be recorded on the tape-shaped recording medium; and control means for controlling said recording means in accordance with a detection result of said detection means so as to start the halfway recording of the image data at an area subsequent to a track of the tape-shaped recording medium in which the still image data detected by said detection means are recorded.

18. A recording apparatus comprising:

recording means for recording image data in a plurality of tracks formed on a tape-shaped recording medium on which moving image data and still image data are recorded, each of the still image data and the moving image data being recorded on a plurality of tracks formed on the tape-shaped recording medium;

detection means for detecting that a track corresponding to a recording start position of the image signal to be recorded is included in an area in which the still image data is already recorded; and control means for controlling said the recording means in accordance with a detection result of said detection means so as to start recording the image data at a track subsequent to the area in which the still image data is already recorded.

* * * * *

UNITED STATES PATENT AND TRADEMARK OFFICE
CERTIFICATE OF CORRECTION

PATENT NO.    : 6,240,242 B1  
DATED         : May 29, 2001  
INVENTOR(S)   : Yoshitaka Takeuchi Page 1 of 1

It is certified that error appears in the above-identified patent and that said Letters Patent is hereby corrected as shown below:

<u>Column 8,</u>  
Line 45, "the" should be deleted.

Signed and Sealed this

Second Day of April, 2002

*Attest:*

*Attesting Officer*

JAMES E. ROGAN  
*Director of the United States Patent and Trademark Office*